United States Patent Office 2,763,091
Patented Sept. 18, 1956

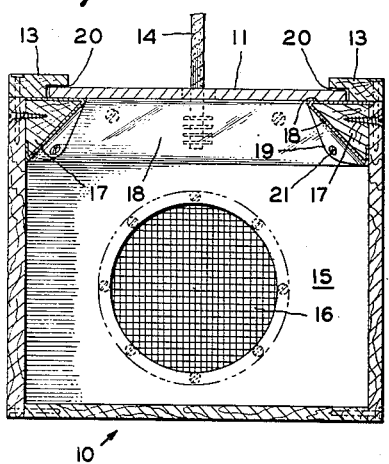
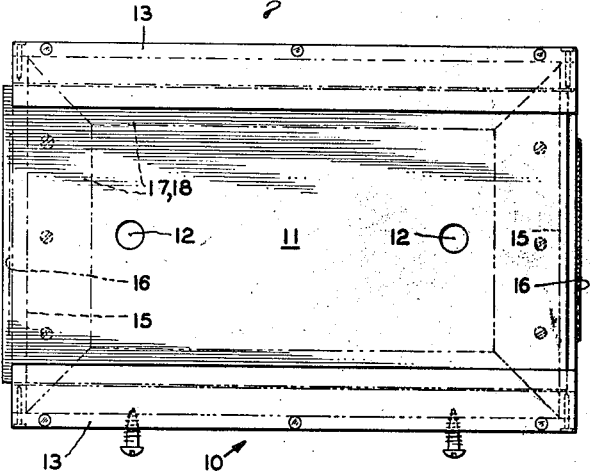
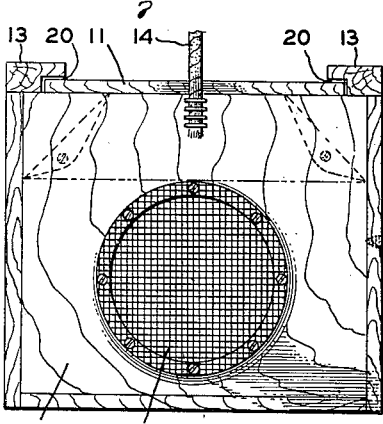
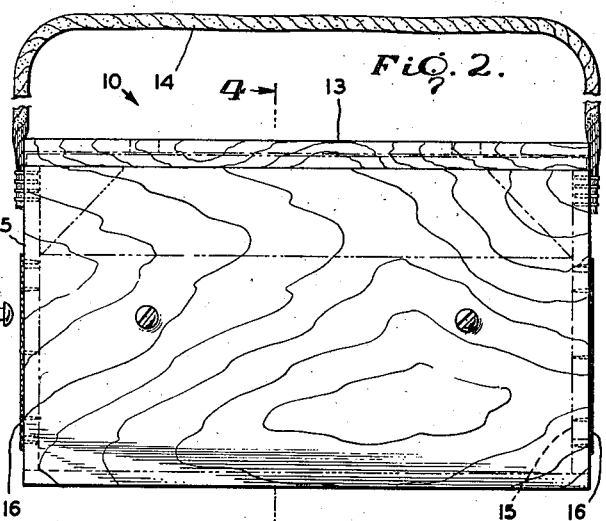
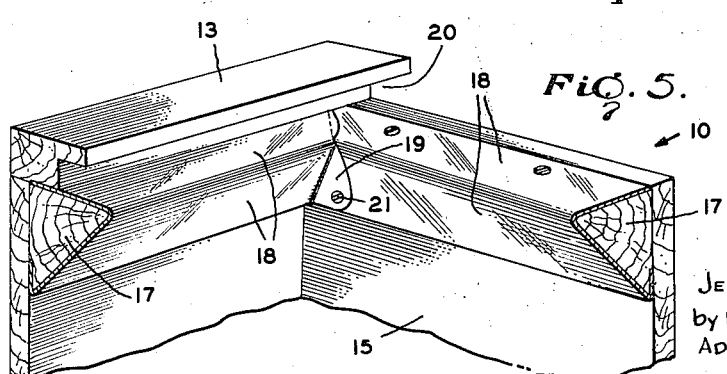

2,763,091
ROACH BOX

Jesse L. Mann, deceased, late of Memphis, Tenn., by Dora S. Mann, administratrix, Memphis, Tenn., assignor of one-half to W. J. Winn and one-half to Bessie E. Winn Continuation of application Serial No. 384,658, October 7, 1953. This application September 22, 1955, Serial No. 535,814

1 Claim. (Cl. 43—55)

The present invention relates generally to fishing tackle equipment and specifically to a bait box containing roaches, and is a continuation of Serial No. 384,658, filed October 7, 1953, for Roach Box, now abandoned.

The principal object of the invention is to provide a bait box for carrying insects, especially roaches, and for keeping them in a healthy and live condition between fishing trips.

Another object of the invention is to provide a lightweight bait box which is handy to carry and from which the single roaches may be removed readily and with relatively little concentration by the fisherman on the individual roach, which is known to be evasive and to move with rapidity.

A still further object of the invention is to provide such a bait box, the key element of which is a slippery surface adjacent the roof of the box which prevents the escape of confined roaches therefrom.

A further object is to provide a bait box in which the darkest portion of the interior, where the roaches are inclined to concentrate, is near the opening or adjacent to the opening through which the fisherman reaches his had to obtain a single roach.

A still further object is to provide within such a bait box a surface from which a roach may be readily removed to which the roach may cling, by an angler's grasping fingers and transferred to a hook or other tackle.

Briefly described, the bait box has ventilated sides or ends covered with screen mesh and near the top of the box adjacent the opening an angular slippery surface is provided which effectively prevents the escape of the confined insects and across the surface of which an insect may be removed by the fisherman's fingers.

These and other objects of the invention will be apparent from the following description when taken in connection with the annexed drawings in which:

Fig. 1 is a top plan view of the invention showing the lid of the box slightly out to the left, the bale handle being omitted, Fig. 2 is a side view in elevation of the invention showing the bail handle, Fig. 3 is an end view in elevation, Fig. 4 is a sectional view taken on line 4—4 of Fig. 2 and Fig. 5 is a fragmentary enlarged perspective view showing the detail of the corner construction.

Referring to the drawing in which like numerals indicate like parts throughout the several views box 10, preferably of wood or other suitable material has a sliding lid 11 of plywood or other suitable material with ventilating openings 12 therein. Lid 11 slidable in the rabbeted grooves 20 in strips 13 fixed to the top of the box. A rope handle or bail 14 fixed to the box ends 15 makes a suitable carrying device and can be moved out of the way of the lid when the box is to be opened. The ends 15 at their lowermost portions have screened sections 16 for ventilation.

Referring to Figures 4 and 5, it will be seen that a core molding consisting of triangular pieces of wood or bezel 17 completely encompasses the upper portion of the box 10 adjacent the opening. A sheet of brass 18, preferably of .005 gauge, is folded over this wood piece 17 and tabs 19, suitably nailed or tacked thereto constitutes a surface upon which the insects cannot obtain footing and, therefore, do not escape when the lid 11 is removed.

In operation it has been found that due to the low position of the screened section 16, the roaches have been found to congregate on the walls, especially the side wall and in the corners adjacent the brass strip 18, and upon removal of the lid 11 a single roach can be found and slid over the brass 18 before it can evade the fingers of the fisherman.

The invention has a further advantage in having, if wood is used, relatively rough walls on the inside on which the roaches exist and live without crowding or piling in the bottom, as in other bait boxes. Roaches that are not used on one fishing trip may be saved for subsequent trips. Food may be placed on the center part of the bottom of the box and is readily removed through the large top opening. It may also be used as a convenient seat for the fisherman, if it is sturdily constructed.

While only a single embodiment of the invention has been described and illustrated, various sizes and change may be made without departing from the spirit and scope of the invention in which it is claimed.

What is claimed is:

A box for confining insects such as roaches or the like comprising a walled container having a closed bottom and an open top portion, a slidable removable lid for the top of said container, the top portion having an internally grooved flange for the accommodation of the edges of said slidable lid extending along the sides thereof, a tiltable handle extending from end to end of said container, said handle, when upright precluding sliding of said lid, a solid angled bezel including a horizontal top surface within said box adjacent said open top, said bezel having a sloping beveled surface downwardly and inwardly inclined at an angle of at least 45° toward the walls of said box, a polished metallic covering for said bezel, completely covering said inclined surface and said horizontal top surface, said bezel and said smooth polished metallic covering extending around all sides of said box, said covering comprising strips, one for each side, each strip, at one extremity, having a substantially right angularly turned tab overlying an adjacent end of an adjoining strip, whereby to form an insect proof seal to preclude an insect from secreting itself between said covering and said bezel, said metallic cover providing an insect-foothold-free covering for said bezel, whereby contained insects cannot hide therebehind nor escape thereover from the container while the lid is open for manual access to the inside of said container.

References Cited in the file of this patent

UNITED STATES PATENTS

| 170,501 | Adams | Nov. 30, 1875 |
| 400,460 | Jennings | Apr. 2, 1889 |
| 524,231 | White | Aug. 7, 1894 |
| 2,000,284 | Hitchins | May 7, 1935 |

FOREIGN PATENTS

| 14,064 | Great Britain | 1910 |